Aug 5, 1941.   F. W. STEIN   2,251,641
APPARATUS FOR TESTING MATERIALS
Filed July 19, 1939   2 Sheets-Sheet 1

INVENTOR
Frederick W. Stein
BY Thos. E. Scofield
ATTORNEY

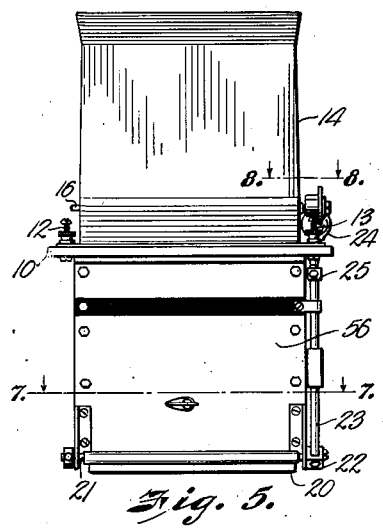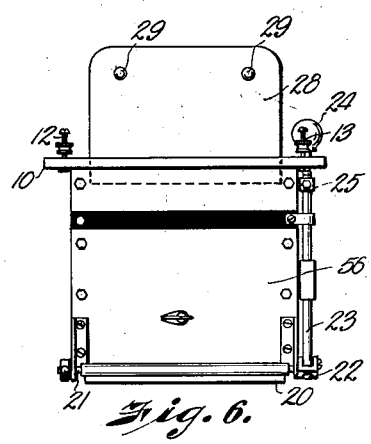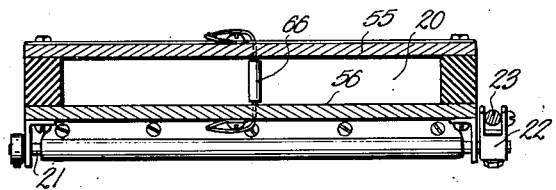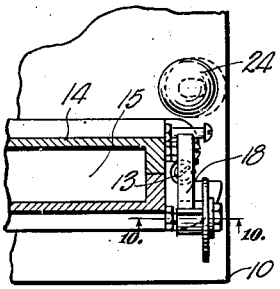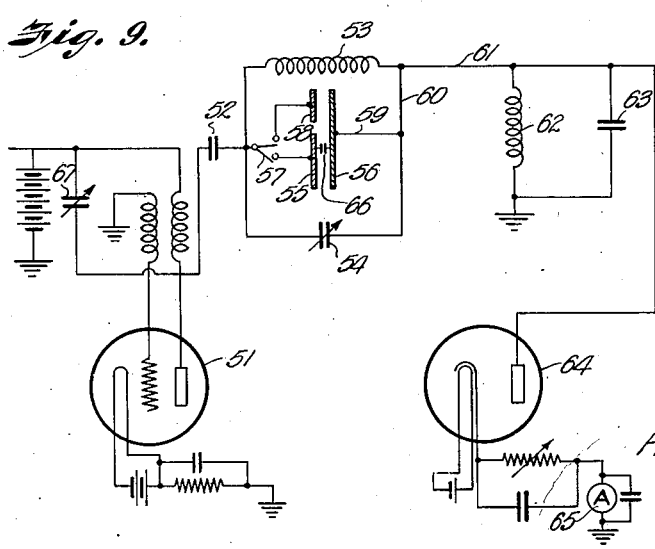

Patented Aug. 5, 1941

2,251,641

UNITED STATES PATENT OFFICE 2,251,641

APPARATUS FOR TESTING MATERIALS

Frederick W. Stein, Atchison, Kans.

Application July 19, 1939, Serial No. 285,325

4 Claims. (Cl. 175—183)

My invention relates to apparatus for testing materials and more particularly to a device for testing the moisture content of cereals, minerals, foods, gases and the like, including corn, wheat, grains of all kinds, plastics, paper, flour, explosives and the like.

It has been frequently suggested that the moisture content of materials such as grains, cereals and flour could be tested by constituting the material to be tested as the dielectric between the plates of a condenser. It has been assumed that the dielectric value of a material will vary as a function of its moisture content. In the prior art, a condenser whose dielectric portion constituted the material to be tested, was placed in an oscillating circuit and the resultant change in frequency was observed as a measure of moisture. Various adaptations of the frequency change principle have been suggested. A fixed frequency oscillating circuit against which a second high frequency oscillating circuit was balanced, has been employed.

I have discovered that the dielectric value does not change as a function of moisture and that accurate results cannot be obtained by considering only the capacity change occasioned by a change in dielectric value. In order to obtain an accurate measurement, it is necessary to measure the impedance change induced by a change in the constituents of the material being examined. The heterogeneity of the material is usually such that inductive impedance can be excluded so that the impedance induced by resistance and capacity can be taken as a true measure of composition.

One object of my invention is to provide a novel apparatus for testing materials and more particularly, to determine their moisture content.

Another object of my invention is to provide a novel apparatus for testing the moisture content of various materials such as flour, grain and the like.

Another object of my invention is to provide an apparatus for testing moisture which is operative over wide ranges of moisture content. In the prior art, where capacitative changes alone were measured, fairly accurate results were had for low moisture contents. At high moisture contents, the increasingly greater inaccuracies were introduced in the moisture testers of the prior art. In my construction, impedance change, due both to resistance and capacity, are considered. Accordingly, my method and instrument are accurate over much greater ranges than the moisture testing devices of the prior art.

Other and further objects of my invention will appear from the following description.

In the accompanying drawings which form part of the instant specification and are to be read in conjunction therewith and in which like reference numerals are used to indicate like parts in the various views;

Figure 5 is an end view of the arrangement shown in Figure 2, with the housing removed.

Figure 6 is an end view of the parts shown in Figure 4, with a portion of the housing wall removed.

Figure 7 is a view on an enlarged scale, taken along the line 7—7 of Figure 5.

Figure 8 is a fragmentary view on an enlarged scale, taken along the line 8—8 of Figure 5.

Figure 9 is a schematic view showing the testing circuit.

Figure 10 is a sectional view taken along the line 10—10 of Figure 8.

Figure 1:
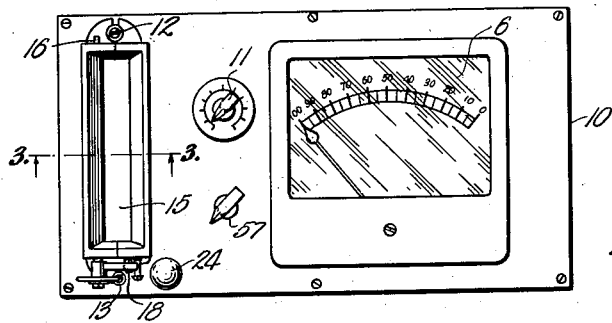
Figure 1 is a top plan view of an instrument embodying one form of my invention.

More particularly referring now to Figure 9, I have shown a thermionic tube 51 connected in a high frequency oscillating circuit adapted to generate radio frequency current. The output of the oscillator is coupled by condenser 52 to a circuit comprising inductance 53 and a condenser 54. A pair of plates 55 and 56 comprise the side walls of the testing cell. A switch 57 is adapted to connect either plate 55 or both plates 55 and 58 to the impressed radio frequency potential. The plate 56 is connected by conductors 59, 60, and 61 to the meter circuit which includes inductance 62 and capacity 63, together with thermionic tube 64 and ammeter 65. The test cell plus the capacity 54 resonates the inductance 53 at a frequency slightly different from the oscillator. Normally, the frequency of resonance of the circuit including the test cell containing air as the dielectric is slightly higher than the frequency of the oscillator. The oscillating network, comprising inductance 62 and condenser 63, has a point of resonance which is much lower than the oscillator frequency.

A compensating condenser 66 is connected across the plates 55 and 56. This compensating condenser is so constructed that its capacity varies inversely as a function of the temperature.

When a material to be tested is placed in the test cell it increases the capacity of the test cell by changing the dielectric from air to the new material. Since all materials have a different dielectric constant than air, it will be readily apparent that the capacity of the test cell, considered as a condenser, will be changed. It will also be apparent that the material to be tested possesses resistance so that the induction of a material into the test cell will represent an equivalent circuit, comprising both capacity and resistance. It will also be obvious that, if the material is of high moisture content, the capacity effect will be smaller compared to the resistive effect on the impedance of the test cell network. If the material is comparatively dry, the resistive effect will be less compared to the capacity effect. The capacity 54 is a variable one. The arrangement is such that the tuning of the circuit comprising inductance 53, condenser 54 and the test cell will be to effect a decrease in frequency of the test cell circuit, which is one half of the reduction in frequency which would be introduced by the dielectric effect of the material being tested, if perfectly dry.

For example, if the test cell were designed for the testing of wheat, and the frequency of the oscillator were two megacycles, and the frequency of the test cell circuit were 2.1 megacycles, the circuit values would be such that perfectly dry wheat placed in the test cell would change the frequency of the test cell circuit to 1.9 megacycles. This change of .2 megacycle leaves the impedance at the same value as it was when the test cell contained only air. Consequently, it is obvious that the moisture present in the material is the factor which thereafter produces the change in the meter reading. The meter, it will be noted, is measuring the moisture present within a selected range governed by the capacity across the cell. Different meter readings are recorded due to the fact that the material being tested affects the dielectric of the test cell and places its impedance directly across the test cell network.

The sensitivity of the test cell network and the meter are so adjusted that a given percentage of moisture in a material will produce full scale deflection of the meter. Moisture contents less than this predetermined value will cause the meter pointer to move off the scale beyond its calibrated portion; while moisture contents greater than the predetermined value will produce an indication on the meter within the calibrated range of the meter scale. Therefore, the entire useful scale may be calibrated for the registration of the moisture percentage or content of the material. Thus, the total impedance change can be calibrated to indicate accurately the moisture content of the wheat.

In normal operation, the coupling condenser 52, the test cell circuit, and the vacuum tube meter circuit form the equivalent of a voltage divider in which the impedance of the coupling condenser 52, the impedance of the test cell network, and the impedance of the vacuum tube meter circuit comprise three branches. When material is placed in the test cell and the resultant capacity of the test cell changes, it will be clear that the resonant frequency of the test cell network is changed. As this approaches and goes past the oscillator frequency, the impedance of the test cell network will change.

It will be clear, further, that as the impedance of the test cell network varies, the indication on the meter 65 will also vary as a function of the impedance offered by the test cell network. This, in turn, will affect the voltage distribution between the output of the oscillator and ground. It will also be apparent that the resistance of the meter is in parallel with the impedance of the tuned test cell circuit. Accordingly, it is the combined effect of the change of capacity of the test cell and the change in resistance between the terminals of the test cell which produces the deflection on the meter. This enables me to accomplish the objects of my invention and to obtain an accurate measure of impedance whose component parts are both capacitative and resistive impedance.

It will also be apparent that, as the impedance changes, the current flowing in the meter will also change. The ammeter may be calibrated so that its reading will indicate, for example, the percentage of moisture present in a particular material. It may be calibrated to measure the amount of butter fat in cream. It will be apparent to those skilled in the art that my arrangement can be used for testing many materials.

Referring now to Figure 1, my testing apparatus is enclosed in a suitable housing, the top of which is formed by a panel 10 carrying the ammeter 6. The panel 10 is provided with binding posts 12 and 13, by which I am enabled to secure a loading device 14. The bottom of the loading device 14 is normally closed by a hinged cover 15, secured to a shaft 16, and normally held in closed position by a latch 18, against the action of spring 17, as can readily be seen by reference to Figures 8 and 10. The arrangement is such that, when the latch 18 is tripped, the spring 17 will rotate the shaft 16 rapidly to quickly open the bottom of the loading device.

Figure 2:
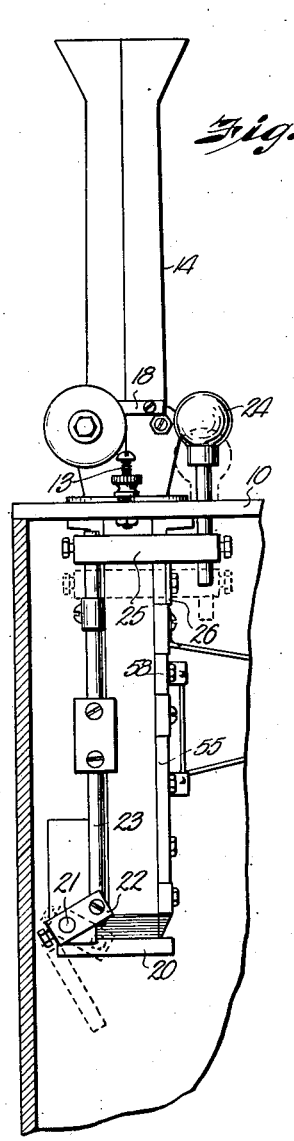
Figure 2 is an enlarged fragmentary side elevation with parts in section, of a portion of my assembly, showing the testing cell and loading arrangement.
Figure 3:
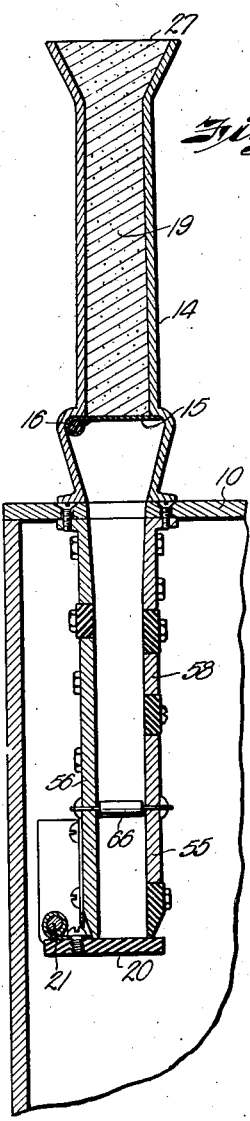
Figure 3 is a sectional view taken on the line 3—3 of Figure 1.
Figure 4:
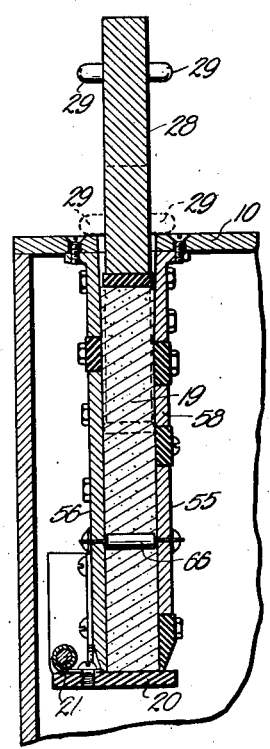
Figure 4 is a view similar to Figure 3, showing the testing cell with the material to be tested in place and the loading arrangement removed.

The construction of my loading device can be best understood by describing the operation of testing a material as for example, flour. The loading device 14 is filled with flour 19, as can readily be seen by reference to Figure 3. It will be noted, by reference to Figure 5, that the loading device is formed with tapered end walls and by reference to Figures 2 and 3, with tapered side walls. The arrangement is such that a cross sectional area of the loading device increases progressively downwardly. This enables the entire load to flow from the loading device without any of the material adhering to the sides thereof. The test cell comprising plates 3 and 4 is normally closed by a hinged cover 20, as can readily be seen by reference to Figures 3 and 4. Figure 2 shows the operating means for cover 20. The cover is secured to a shaft 21 to which is secured a crank 22. The crank is pivoted to a connecting rod 23 which is reciprocated by means of an operating handle 24 and a link 25. The link 25 is free to rotate around the axis of the connecting rod 23. In the position shown in Figure 2, the link 25 engages a shoulder 26 to hold the cover 20 in its closed position.

The upper surface 27 of the flour 19 is leveled off so that a predetermined volume of flour will occupy the loading device 14. The latch 18 is then lifted, permitting the lid 15 to pivot rapidly to allow the flour to flow into the testing cell. The loading device is then removed and a tamping piece 28 is inserted. The tamping piece is shown partially inserted, in full lines in Figure 4. It carries a plurality of pins 29 adapted to engage the panel 10. The tamping member is pushed downwardly to pack the flour to a uniform depth. The position of the tamping piece is shown in dotted lines in Figure 4, when the flour has been fully packed.

It is understood, of course, that the capacity 54 is adjusted by operating handle 11 (shown in Figure 1) so that the frequency of the test cell circuit will be such that the introduction of the flour to be tested into the test cell will decrease the frequency of the test cell circuit past resonance with the frequency of the oscillating circuit. It is understood, of course, that the frequency of the oscillating circuit may be changed, if desired, by adjusting the capacity of condenser 67.

After the material to be tested (in this case flour) has been tamped in place, the plates 55 and 56 will be bridged by the flour. The change in impedance occasioned both by the capacitative change due to the change in dielectric and to the resistance effect, will vary the reading on the meter. The meter is normally initially adjusted to give a predetermined scale reading. The change in scale reading is then read and compared with a table calibrated to convert scale reading to percentage of moisture.

After the test has been made, the flour is dumped by operating cover 20 and the operation may be repeated upon further samples.

It will be understood that I have given flour by way of example and not by way of limitation. My device may be employed for testing any material whose impedance will vary depending upon the various properties of the material to be tested. All that is necessary is a table, calibrated to show changes of impedance for various percentages of the ingredients producing the impedance change.

It will be observed that I have accomplished the objects of my invention. I have provided a novel apparatus for testing materials in which I measure the impedance to the flow of a high frequency current instead of the customary apparatus for determining frequency changes induced in condensers in which the material to be tested comprises the dielectric of a condenser in the circuit. Both resistance, as well as capacity changes, are taken into account by my method and the aggregate impedance change measured. In this manner, I am enabled to obtain accurate readings over wide ranges, a thing which has hitherto been impossible by any of the devices of the prior art.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, I claim:

1. In a moisture testing apparatus, a high frequency current generator, a pair of conducting plates spacedly positioned from each other and forming the side walls of a housing adapted to contain the material to be tested, conductors for impressing the output of said high frequency generator across the conducting side walls of said housing, a member of insulating material forming the bottom of said housing, means for readily removing said insulated member to dump the contents of said housing, a housing of predetermined volume mounted above said testing housing, said second housing having a movable bottom, and means for mounting said second housing in communication with said first housing whereby a predetermined volume of material to be tested may be placed in said second housing for passage to said testing housing.

2. An apparatus for testing materials to determine the relative amount of conducting constituents present, including in combination a high frequency current generator, a housing formed with side walls comprising conducting plates spacedly positioned from each other by insulating end walls, means for impressing a high frequency current across said conducting plates, a temperature compensated capacity interconnecting said conducting plates, said housing being adapted to contain the material to be tested, and an ammeter for measuring the capacitative and resistive impedance effect to the passage of a high frequency current of the material between said plates.

3. A device for testing materials including in combination a high frequency generator, tuned to a predetermined radio frequency, a test circuit comprising an inductance and a condenser forming a test housing, an ammeter connected in series with said test circuit across the output of said high frequency generator, means for introducing the material to be tested into said housing, the construction being such that said ammeter is adapted to measure the capacitative and resistive impedance of the material being tested to the passage of the high frequency current.

4. A device for testing the moisture of materials including in combination a high frequency generator, a test cell network including the material to be tested, a vacuum tube meter circuit including an ammeter, means for impressing the output of said generator upon said test cell network, means for impressing the output of said test cell network upon said vacuum tube meter circuit, said vacuum tube meter circuit and said test cell network forming branches of an equivalent voltage divider circuit, the construction being such that the current flowing in the vacuum tube meter circuit will vary as a function of the capacitative and resistive impedance of the test cell network.

FREDERICK W. STEIN.